Figure 1:
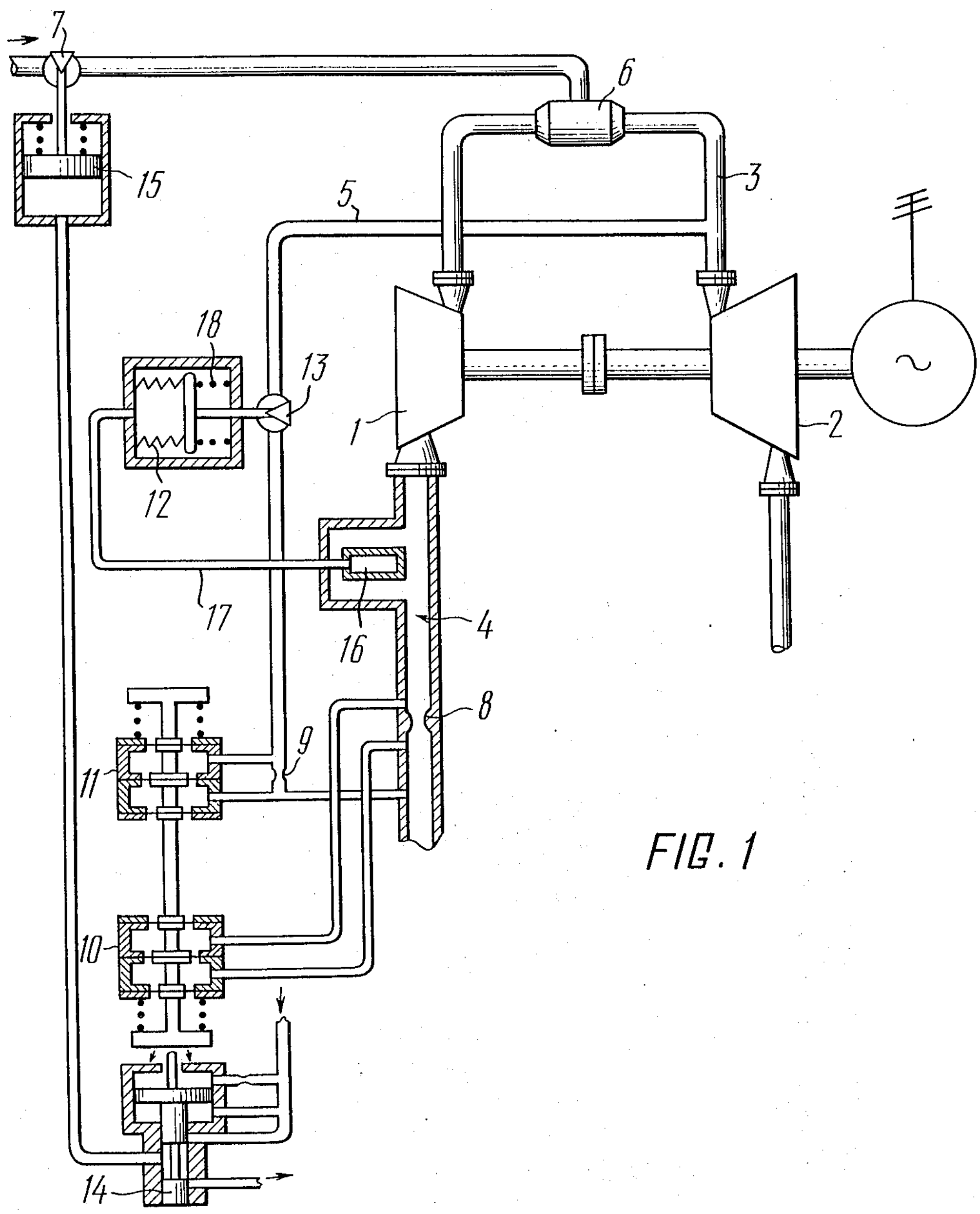

United States Patent [19]

Ratner

[11] 3,943,704

[45] Mar. 16, 1976

[54] TEMPERATURE CONTROL DEVICE BEFORE THE TURBINE OF A GAS-TURBINE POWER UNIT

[76] Inventor: Isaak Semenovich Ratner, prospekt Kosmonavtov, 23, korpus 1, kv. 25, Leningrad, U.S.S.R.

[22] Filed: Mar. 19, 1974

[21] Appl. No.: 453,005

[52] U.S. Cl. ........................ 60/39.28 T; 60/39.16 R

[51] Int. Cl.[2] ............................................ F02C 9/08

[58] Field of Search .. 60/39.28 R, 39.28 T, 39.16 R

[56] References Cited

UNITED STATES PATENTS

| | | | |
|---|---|---|---|
| 3,040,529 | 6/1962 | Hurtle | 60/39.28 R |
| 3,271,950 | 9/1966 | McCabe | 60/39.28 R |
| 3,332,232 | 7/1967 | Beyers | 60/39.28 R |
| 3,438,199 | 4/1969 | McGinnis et al | 60/39.28 R |
| 3,511,047 | 5/1970 | Yates | 60/39.28 R |

*Primary Examiner*—Carlton R. Croyle
*Assistant Examiner*—Robert E. Garrett
*Attorney, Agent, or Firm*—Haseltine, Lake & Waters

[57] ABSTRACT

A temperature control device in a gas-turbine unit of a single-shaft or twin shaft type for the turbine of the unit, comprising two transmitters, one of the two transmitters being intended for controlling the pressure differential across a first orifice mounted in the pipeline upstream of the compressor of the gas-turbine unit, whereas the second of the two transmitters is intended for controlling the pressure across another orifice mounted in the pipeline that connects the pipeline upstream of the turbine with the pipeline upstream of the compressor, provision being made for disposing a valve of an adjusting device for sensing the temperature in said pipeline upstream of the compressor, the variations in the position of the valve being sensed by the second pressure drop sensor, the two pressure differential transmitters being connected in such a manner than their output signals are added together and the resultant signal is fed to an actuating device for changing the flow of fuel to the combustion chamber to control the gas temperature of the gas supplied to the turbine, two identical temperature control devices as described above being used for a twin shaft type gas turbine unit, each one of the temperature control devices being intended for controlling the temperature upstream of either one of the two turbines of the unit.

1 Claim, 2 Drawing Figures

TEMPERATURE CONTROL DEVICE BEFORE THE TURBINE OF A GAS-TURBINE POWER UNIT

The present application is related to application Ser. No. 393,751 filed Sept. 4, 1973, and now abandoned which, in turn, is a Rule 60 continuation of Ser. No. 129,396 filed Mar. 30, 1971 also now abandoned.

The present invention relates to the art of controlling the temperature in a gas-turbine and more particularly, to temperature control devices installed upstream of the turbine of a gas-turbine power unit.

Known in the art are temperature controllers adapted to be installed upstream of the turbine of a gas-turbine power unit, in which unit provision is made for a temperature adjuster sensing the temperature upstream of the compressor.

The known temperature controller operates on the principle of regulating the relation between the discharge pressure of a medium delivered by a compressor and the position of a fuel valve in the gas-turbine power unit, which valve serves for controlling the fuel flow. Said controller, when adjusted for a certain temperature upstream of the turbine, prevents the fuel valve from opening if the discharge pressure of the medium delivered by the compressor is below a pre-set value.

However, said controller is incapable of limiting the temperature upstream of the turbine, if the fuel flow-rate is subject to fluctuations with the fuel valve being in a fixed position. This situation may arise as a result of pressure fluctuations upstream of the fuel valve due to failure of the automatic system to maintain the pressure, or else because of variations in the calorific value of the fuel gas used, e.g. as a result of condensate finding its way into the combustion chamber. Indeed, despite the use of fuel cleaning systems, heavy fractions are liable to form a condensate in the gas line. Condensate admitted into the combustion chamber causes a temperature surge, to which the prior-art temperature controller responds, not by closing the fuel valve, but by opening said valve still further inasmuch as the pressure upstream of the turbine will increase in response to the temperature surge. Moreover, when operating on with a liquid fuel, the throughput of the nozzles in the combustion chamber tends to increase due to wear on the nozzle edge, the net result being increased fuel flow-rate through the fuel valve, although the valve position and the pressure ahead thereof remain unchanged.

Hence, diverse factors affect the performance accuracy of the prior-art temperature controller disposed upstream of the turbine of a gas-turbine power unit, thus causing serious operational problems.

The principal object of the present invention is to provide a temperature control device mountable upstream of the turbine of a gas-turbine power unit, whose operation would be is independent of the fuel characteristics upstream of the fuel valve and of the discharge characteristics of the compressor or fuel supply elements.

The object is achieved in a gas-turbine power unit comprising a compressor, a turbine installed downstream of said compressor; a first pipeline connected to the inlet side of said turbine; a second pipeline provided upstream of said compressor; a third pipeline connecting said first and said second pipelines; a combustion chamber installed between the compressor outlet side and the inlet side of the turbine and communicating therewith; a means for feeding fuel to said combustion chamber; means for controlling the supply of fuel to said combustion chamber, and a temperature control device for said turbine, the latter, according to the invention, comprising: a first orifice mounted in said second pipeline; a second orifice mounted in said third pipeline; a first pressure transmitter connected to said first orifices for sensing the pressure differential in said second pipeline upstream and downstream of said first orifice; a second pressure transmitter connected to said second orifice for sensing the pressure differential in said third pipeline upstream and downstream of said second orifice; a means for sensing the temperature in the second pipeline upstream of the compressor for adjusting the temperature of the gas upstream of the turbine supplied by said compressor; a valve means in said third pipeline upstream of said second orifice, said valve means being functionally connected to the temperature sensing means so that a signal generated by said temperature sensing means adjusts the extent to which said valve means is opened which causes a change in the pressure differential in said third pipeline at said second diaphragm, said second pressure transmitter sensing the pressure changes in said third pipeline and generating an output signal whose value is a function of the position change experienced by said valve; a means connected to the first and the second transmitters for adding up the signals produced by said transmitters; and an actuating member connected to the means for adding up the signals and functionally associated with said means for controlling the supply of fuel to the combustion chamber to cause a change in the fuel supply in order to limit the temperature of the gas entering the turbine.

In case of a twin-shaft gas-turbine unit, two temperature control devices described above are used, each being intended for controlling the temperature upstream of each respective one of the turbines.

Said resulting signal in the present controller is related to the ratio between the gas flow-rate through the turbine and the pressure and temperature upstream of said turbine, owing to which the value of said signal is not affected by the fuel characteristics and the discharge characteristics of the compressor or fuel supply elements.

Figure 2:
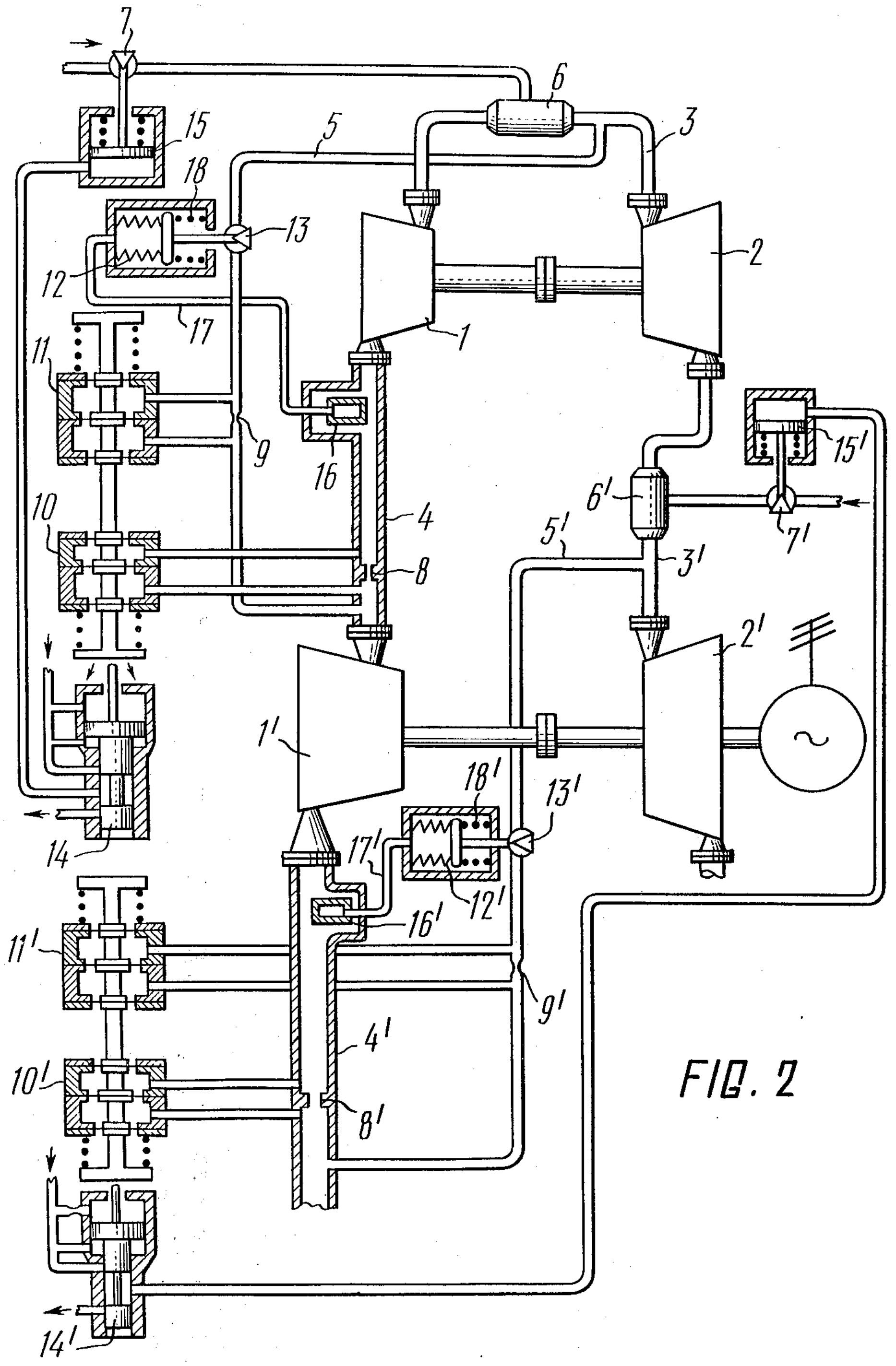

The present invention is illustrated by the description of preferred embodiments of the temperature control device installable upstream of the turbine of a gas-turbine power unit, according to the invention, with reference to the accompanying drawings, wherein:

FIG. 1 illustrates a temperature control device for a single-shaft gas-turbine power unit; and FIG. 2 shows temperature control devices for a twin-shaft gas-turbine unit with two compression and air preheat stages.

The temperature control device according to the present invention can be used for limiting the temperature upstream of turbines having different gas-turbine plant flow diagrams.

In one of embodiments, the gas turbine power unit is of a single-shaft type, comprising a compressor 1 (FIG. 1), a turbine 2 installed downstream of said compressor 1, a first pipeline 3 connected to the inlet side of said turbine 2; a second pipeline 4 installed upstream of the compressor 1; a third pipeline 5 connecting the first pipeline 3 and the second pipeline 4; a combustion chamber 6 installed intermediate between of the outlet of the compressor 1 and the inlet of the turbine 2 and communicating with a means for supplying fuel (not shown in FIG. 1) to said combustion chamber 6, a device 7 for controlling the fuel supply to said combustion chamber 6 and a temperature control device for said turbine, comprising: a first orifice 8 installed in said second pipeline 4; a second orifice 9 installed in said third pipeline 5; a first transmitter 10 connected to said first orifice 8 for sensing the variations of pressure differential in said second pipeline 4 upstream and downstream of said first orifice 8; a second transmitter 11 coupled to said second orifice 9 for sensing the pressure differential in said third pipeline 5 upstream and downstream of said second diaphragm 9; a means 12 for responding to the temperature in the second pipeline 4 upstream of the compressor 1; a valve 13 in said third pipeline 5 upstream of said second diaphragm 9, the valve 13 being functionally associated with the means 12 so that a signal generated by said means 12 changes the position of valve 13 to cause a change in the pressure differential in said third pipeline 5 at said second diaphragm 9, said second pressure transmitter 11 sensing the pressure changes in said third pipeline 5 and generating an output signal whose value is a function of the position change experienced by said valve 13; a means 14 kinematically associated with the first transmitter 10 and the second transmitter 11 for adding together the signals produced by said transmitters; an actuating member 15, connected to the means 14 for adding together the signals and functionally associated with said device 7 for controlling the supply of fuel to the combustion chamber 6 to cause a change in the fuel supply in order to limit the temperature of the gas entering the turbine 2.

The means 12 operates in accordance with the temperature upstream of the compressor 1, which operation is achieved by means of a fluid contained in a confined space formed by a temperature cylinder 16, a capillary tube 17 and the device 12 which includes a bellows and spring means 18. In case of a change in the air temperature upstream of the compressor 1 the fluid will expand, causing said bellows and spring 18 in the device 12 to displace, thus actuating the valve 13.

This will cause a change of pressure at the second diaphragm 9, which is necessary for adjusting the device for controlling the temperature of the gas upstream of the turbine in accordance with the temperature upstream of the compressor.

With the gas turbine power unit operating, the flowrate of gas through the turbine 2 is related to the pressure and temperature upstream of said turbine, which is described by the following approximate equation:

$$G = \beta \frac{p}{\sqrt{T}};$$

wherein $G$ is the gas flowrate through the turbine, $\beta$ is the proportionality factor, $p$ is the pressure upstream of the turbine, $T$ is the temperature upstream of the turbine;

hence $$\frac{G\sqrt{T_o}}{P_o} = \beta \frac{P}{P_o} \sqrt{\frac{T_o}{T}}$$

wherein $T_o$ is the temperature upstream of the compressor, $p_o$ is the pressure upstream of the compressor.

The temperature adjuster is operative when the following condition is satisfied:

$$\frac{G\sqrt{T_o}}{p_o} = \alpha \frac{p}{p_o}$$

wherein $$\alpha = \beta \sqrt{\frac{T_o}{T}}.$$

The left term of the equation $$\left(G \frac{\sqrt{T_o}}{p_o}\right)$$

refers to the flow conditions through the compressor which is a function of the pressure differential measured by transmitter 10, whereas the right term of the equation $$\left(\alpha \frac{p}{p_o}\right)$$

is related to the pressure differential at the orifice 9 as measured by transmitter 11. The valves measured by the transmitters are summed by valve 14 which controls actuator 15, and when unbalance in valve 14 occurs, the actuator 15 is operated to vary the fuel flow thereby controlling the temperature at the inlet of the turbine.

FIG. 2 illustrates an embodiment of a twin-shaft gas turbine unit having the compression and air heating stages, wherein the proposed temperature control devices are provided upstream of each turbine.

In this case the gas turbine unit, in addition to the components described and shown in FIG. 2 comprises: a compressor 1' installed upstream of the compressor 1; a combustion chamber 6' installed downstream of the turbine 2; a turbine 2' installed downstream of the combustion chamber 6'; a fourth pipeline 3' connected to the inlet side of said turbine 2'; a fifth pipeline 4' provided upstream of the compressor 1'; a sixth pipeline 5' connecting the fourth pipeline 3' and the fifth pipeline 4'; a device 7' for controlling the supply of fuel to said combustion chamber 6'; and a second temperature control device for said turbine 2', comprising: a first orifice 8' installed in said fifth pipeline 4'; a second orifice 9' installed in said sixth pipeline 5'; a first pressure transmitter 10' connected to said first orifice 8' for sensing the pressure differential in said fifth pipeline 4' upstream and downstream of the first orifice 8', and a second pressure transmitter 11' connected to said second orifice 9' for sensing the pressure differential in said sixth pipeline 5' upstream and downstream of said second orifice 9'; a means 12' for sensing the temperature in the fifth pipeline 4' upstream of the compressor 1' for adjusting the temperature of gas upstream of said turbine 2'; a valve 13' in said sixth pipeline 5' upstream of the second diaphragm 9', functionally associated with the means 12' so that a change in the degree of opening of said valve 13' in response to a signal from said means 12' results in a change in the pressure differential in said sixth pipeline 5' at said second orifice 9', said second pressure transmitter 11' sensing the change in pressure in said sixth pipeline 5' and generating an output signal whose value is a function of the position of said valve 13'; a means 14', kinematically associated with the first transmitter 10' and the second transmitter 11' for adding up the signals from said transmitters; an actuating member 15', connected to the means 14' and functionally associated with said device 7' for controlling the supply of fuel to the combustion chamber 6' to cause a change in the fuel supply in order to limit the temperature of the gas entering the turbine 2'.

The means 12' operates in accordance with the temperature upstream of the compressor 1', which operation is achieved by means of a fluid contained in a confined space formed by a temperature cylinder 16', a capillary tube 17', and the device 12'. In case of a change in the air temperature upstream of the compressor 1', the fluid will expand, causing the bellows and spring 18' in the device 12' to displace, thus actuating the valve 13'.

This will cause a change in pressure at the second diaphragm 9', which is necessary for adjusting the device controlling the temperature of the gas upstream of the turbine 2' in accordance with the temperature upstream of the compressor 1'.

With the gas turbine unit operating, the flowrate of gas through the turbine 2' according to FIG. 2 is related to the pressure and temperature upstream of said turbine by the same approximate relationship as that used for the case of a gas turbine unit of the single shaft type described above.

What is claimed is:

1. In a gas turbine unit including a compressor; a turbine installed downstream of said compressor; a first pipeline connected to the inlet side of said turbine; a second pipeline provided upstream of said compressor; a third pipeline connecting said first and said second pipelines; a combustion chamber installed between the compressor outlet side and the inlet side of the turbine and communicating therewith; a means for feeding fuel to said combustion chamber; means for controlling the supply of fuel to said combustion chamber; a temperature control device for said turbine; said temperature control device comprising: a first orifice mounted in said second pipeline; a second orifice mounted in said third pipeline; a first pressure transmitter connected to said first orifice for sensing the pressure differential in said second pipeline upstream and downstream of said first orifice; a second pressure transmitter connected to said orifice for sensing the pressure differential in said third pipeline upstream and downstream of said second orifice; a means for sensing the temperature in the second pipeline upstream of the compressor; a valve means in said third pipeline upstream of said second orifice, said valve means being functionally associated with said temperature sensing means so that in response thereto a change in the degree of opening of said valve means causes a change in the pressure differential in said third pipeline at said second orifice, said second pressure transmitter thereby generating the output signal whose value is a function of the position change experienced by said valve means; a means connected to the first and the second transmitters for adding up the signals produced by said transmitters; an actuating member connected to the means for adding up the signals and functionally associated with said means for controlling the supply of fuel to the combustion chamber to cause a change in the fuel supply in order to limit the temperature of the gas entering the turbine.

* * * * *